United States Patent
Azpiazu

(10) Patent No.: US 12,011,681 B2
(45) Date of Patent: Jun. 18, 2024

(54) SYSTEM AND METHOD FOR FLUID FILTRATION

(71) Applicant: Aurelio Azpiazu, Port Republic, MD (US)

(72) Inventor: Aurelio Azpiazu, Port Republic, MD (US)

(*) Notice: Subject to any disclaimer, the term of this patent is extended or adjusted under 35 U.S.C. 154(b) by 317 days.

(21) Appl. No.: 17/289,812

(22) PCT Filed: Oct. 29, 2019

(86) PCT No.: PCT/US2019/058603
§ 371 (c)(1),
(2) Date: Apr. 29, 2021

(87) PCT Pub. No.: WO2020/092397
PCT Pub. Date: May 7, 2020

(65) Prior Publication Data
US 2021/0394092 A1    Dec. 23, 2021

Related U.S. Application Data

(60) Provisional application No. 62/752,086, filed on Oct. 29, 2018.

(51) Int. Cl.
*B01D 29/33* (2006.01)
*B01D 17/02* (2006.01)
(Continued)

(52) U.S. Cl.
CPC .......... *B01D 29/333* (2013.01); *B01D 17/02* (2013.01); *B01D 29/58* (2013.01); *B01D 39/2027* (2013.01); *B01D 2201/12* (2013.01)

(58) Field of Classification Search
CPC ...... B01D 29/333; B01D 17/02; B01D 29/58; B01D 39/2027; B01D 2201/12;
(Continued)

(56) References Cited

U.S. PATENT DOCUMENTS

| 4,687,579 A * | 8/1987 | Bergman | ............... B01D 46/54 55/497 |
| 4,832,836 A * | 5/1989 | Selsdon | ................. B01D 29/58 184/6.24 |

(Continued)

FOREIGN PATENT DOCUMENTS

JP    H07323217 A    12/1995

OTHER PUBLICATIONS

PCT International Search Report and Written Opinion dated Jan. 16, 2020 in counterpart PCT application PCT/US2019/058603, 8 pages.

*Primary Examiner* — Waqaas Ali
(74) *Attorney, Agent, or Firm* — Juan Carlos A. Marquez; Marquez IP Law Office, PLLC

(57) ABSTRACT

A filter device provides for designs that permit variable levels of solid particle and water molecule removal. The filter device retains the particles and the water molecules in the filter medium when removed, thus avoiding the re-entry of the particles and water molecules when the power system has cooled down as is now likely in conventional filters currently in use. Further, the filter device traps the water molecules already present in the fluid being filtered (i.e., "native water"), as well as any moisture resulting from condensation that may be introduced into the lubrication system whenever it is opened.

5 Claims, 5 Drawing Sheets

(51) Int. Cl.
*B01D 29/58* (2006.01)
*B01D 39/20* (2006.01)

(58) Field of Classification Search
CPC ............ B01D 2239/0421; B01D 29/33; B01D 39/2034; B01D 39/2044; B01D 2201/347
See application file for complete search history.

(56) References Cited

U.S. PATENT DOCUMENTS

| | | |
|---|---|---|
| 5,102,542 A | 4/1992 | Lawrence et al. |
| 5,126,043 A * | 6/1992 | Giordano ............... B01D 65/00 |
| | | 210/287 |
| 6,391,193 B1 * | 5/2002 | Luka .................... B01D 27/103 |
| | | 210/DIG. 17 |
| 2010/0170208 A1 | 7/2010 | Matula et al. |

* cited by examiner

SYSTEM AND METHOD FOR FLUID FILTRATION

CROSS REFERENCE TO RELATED APPLICATIONS

This application is a national stage application filed under 35 U.S.C. § 371, of International Patent Application No. PCT/US2019/058603, filed on Oct. 29, 2019, which claims priority to U.S. Provisional Application No. 62/752,086 filed on Oct. 29, 2018, both of which are incorporated by reference herein their entireties.

BACKGROUND OF THE INVENTION

1. Scope of the Invention

The present invention is directed to a system and method for filtering viscous fluids, such as motor oil, so as to improve the useful life of the fluid. In particular, the present invention filters particulates from the fluid, while also absorbing water out of the fluid. This results in a viscous fluid that is free from excessive water content and contaminants.

2. State of the Prior Art

The use and processing of oil, fuel and other lubricants or fluids used in mechanical systems suffers from a lack of adequate filtration to remove contaminants and excess water. While ultra-filtration processes exist for such extreme requirements as in medical research and similar products, the same levels of filtration level have not been possible to include within existing mechanical systems. For purposes of discussion only, the main focus of the invention to be disclosed hereinafter will focus on automotive or engine lubrication. That said, nothing described is limited to only that application.

Even the best oil, regardless of traditional motor oil or the much improved synthetic blends, will have solid contaminants (i.e., particles or particulates) and what will be referred to hereinafter as "native water." For purposes of the discussion herein, "particles" and "particulates" will mean small solids that can best be seen with a microscope. These particles range from less than one micron (very small) to 10 microns and some larger ones as well. "Native water" will mean moisture or water molecules that either exist in the oil from its natural source and/or as a result of the refining and processing required.

The presence of contaminants and water combine to damage the equipment (in most cases a motor) which the oil seeks to lubricate. As the contaminant particles are usually metal, they are subject to rusting. In other cases, the particles act as abrasives that wear on the surfaces the oil seeks to lubricate. The combination of contaminants and water present in the oil is thus not conducive to the motor's performance or to the useful life of the motor.

Conventional existing filters attempt to remove contaminants from the lubricant. In most cases, a conventional filter is a simple paper or cellulose, or even fiberglass filter that is placed in various configurations in the engine's oil flow and seeks to trap the solid contaminants. Typically, most filters capture particles larger than 10 microns and little to none of the water. Some users install additional systems that have to be installed externally at higher cost with modifications to the engine or system. These additional systems and modifications are often restricted to larger prime movers and only if the vehicle in which it is installed has adequate space to accommodate the change.

A few, more advanced and expensive filters, try to improve on the structure of conventional filters by having two different "thicknesses of filter" material to pass the fluid through both and try to remove smaller particles. However, these supposedly more advanced filters initially filter out more particles, but cannot hold the particles when the engine and filter cool down. Thus, the particles collected by these more advanced filters simply fall out and re-enter the flow of the oil when the engine is activated again. In the case of fiberglass filters, these types of filters have been known to release fiberglass strands into the fluid adding to the contaminants that are already present.

In addition, all previous conventional designs as described above cannot effectively filter out and hold the water that is already present in the fluids being filtered (i.e., "native water"), and thus cannot output a fluid that is truly contaminant-free (e.g., free of solid and liquid contaminants).

Another factor in filter designs is cost-in order to achieve the improved quality of filtration there is a cost factor that any new design must consider.

The design described hereinbelow considers and overcomes the above-mentioned limitations.

DESCRIPTION OF THE DRAWINGS

The present invention is illustrated in the accompanying drawings, wherein.

DETAILED DESCRIPTION OF THE PREFERRED EMBODIMENTS

The present invention as will be described below has numerous advantages: A filter device implemented according to the invention provides for designs that permit variable levels of solid particle and water molecule removal. A filter device according to the invention retains the particles and the water molecules in the filter medium when removed thus avoiding the re-entry of the particles and water molecules when the power system has cooled down as is now likely in conventional filters currently in use. Further, a filter device according to the invention traps the water molecules already present in the fluid being filtered (i.e., "native water"), as well as any moisture resulting from condensation that may be introduced into the lubrication system whenever it is opened (i.e., for routine maintenance checks).

The present invention embodies a simpler design that eliminates at least three pieces currently used in manufacturing the end use applications of the improved mediums. In addition, it embodies a novel application of different filtering mediums than are now in use in other available production products. Even more, the present invention provides for lower overall costs to the end user as minor production costs increases are compensated in lower operating and maintenance costs as well as increased operational time, cleaner emissions and less use of resources. The design of the present invention also permits end products that are easily replaced in the existing access ports in any prime mover for which it may be produced.

The implementation of the present invention includes two different filter media. The first filter media would consist of a sintered stainless steel or other similar medium that can be produced in particle trapping sizes of as small as 2 microns. A commercially available version of such a stainless steel media is designed and produced as well as separately patented by BEKAERT Filtration.

The second media consists of a long-fiber filtering media designed to separate particles as small as 8-10 microns. The long-fiber, media would be designed with properties for holding and retaining "native water" or moisture introduced to the lubrication system. Commercially available media are currently in production for other non-lubrication applications. The long-fiber material may be selected from, for example, any non-cellulose materials known in the art that are capable of performing this function, or from proprietary materials specially designed for this purpose and for surviving in the environment in which conventional oil filters, fuel filters and the like are used. Such long-fiber media can provide improved removal of the contaminants described above. Among the main advantages of the present invention, neither medium described above releases the solids trapped in the filter device when the engine and fluids cool down.

Figure 1:
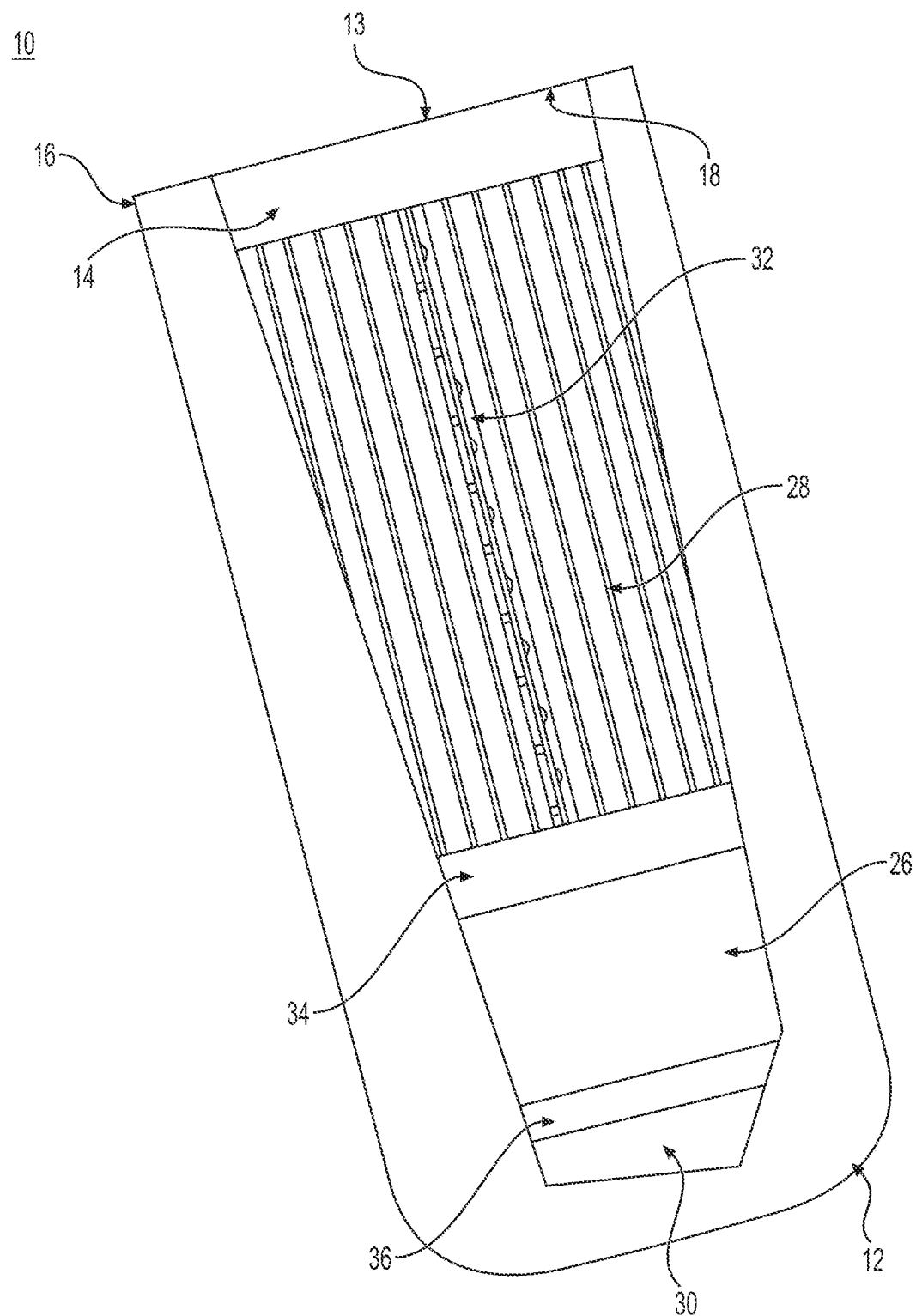
FIG. 1 shows an overall view in partial cross-section of at least one embodiment of the filter device according to the present invention.
Figure 2:
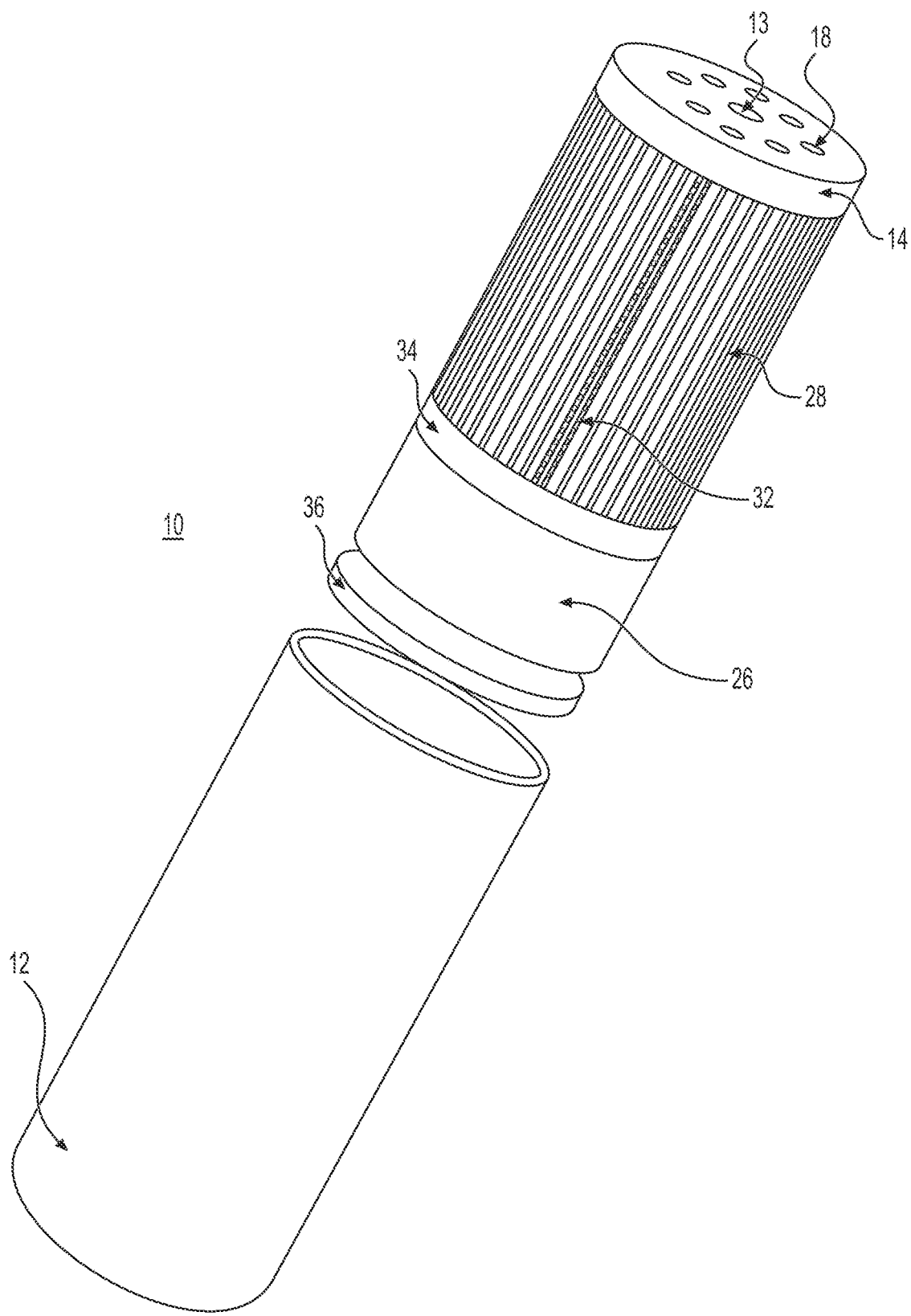
FIG. 2 shows an exploded view of the at least one embodiment of the filter device according to the present invention.

In an exemplary embodiment or implementation of the filter device according to the present invention, as shown in FIGS. 1 and 2, the filter device 10 in cross-section comprises a substantially cylindrical body 12 which acts to encase the internal parts of the filter 10. The body 12 of the filter 10 comprises a front face plate 14 forming a substantially circular cover for the front end of the filter 10. The front face plate 14 is formed so as to enable it to connect to an input port for the oil or fuel and to receive an annular seal 16 along an outer periphery of the front face plate 14. It is preferred that the size, shape and configuration of the front face plate 14 and seal 16 is such that the filter 10 is connectable with a conventional filter connection port for either an oil and/or fuel reservoir system.

Figure 3:
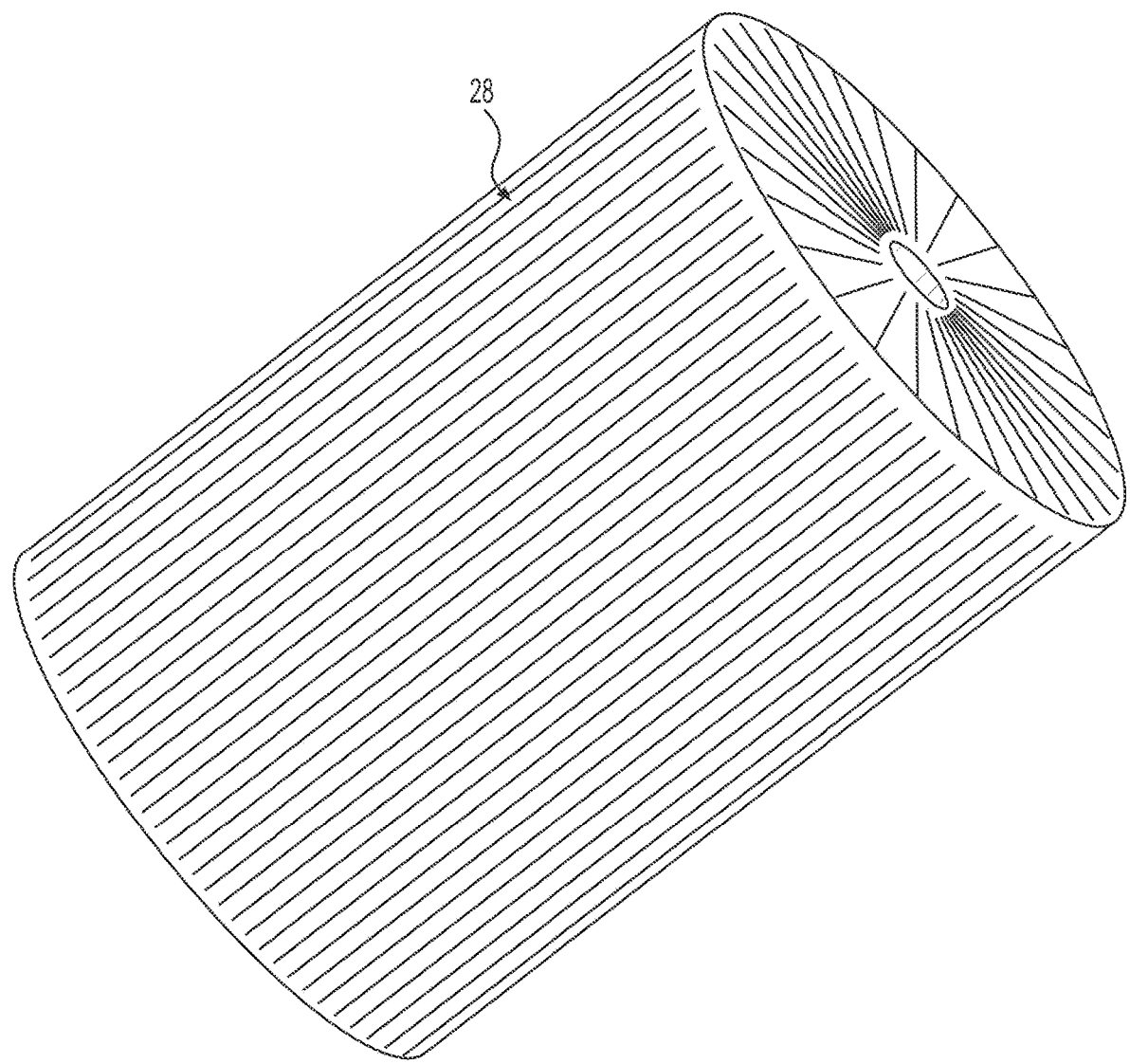
FIG. 3 shows at least one embodiment of the first filter media in the filter device according to the present invention.
Figure 4:
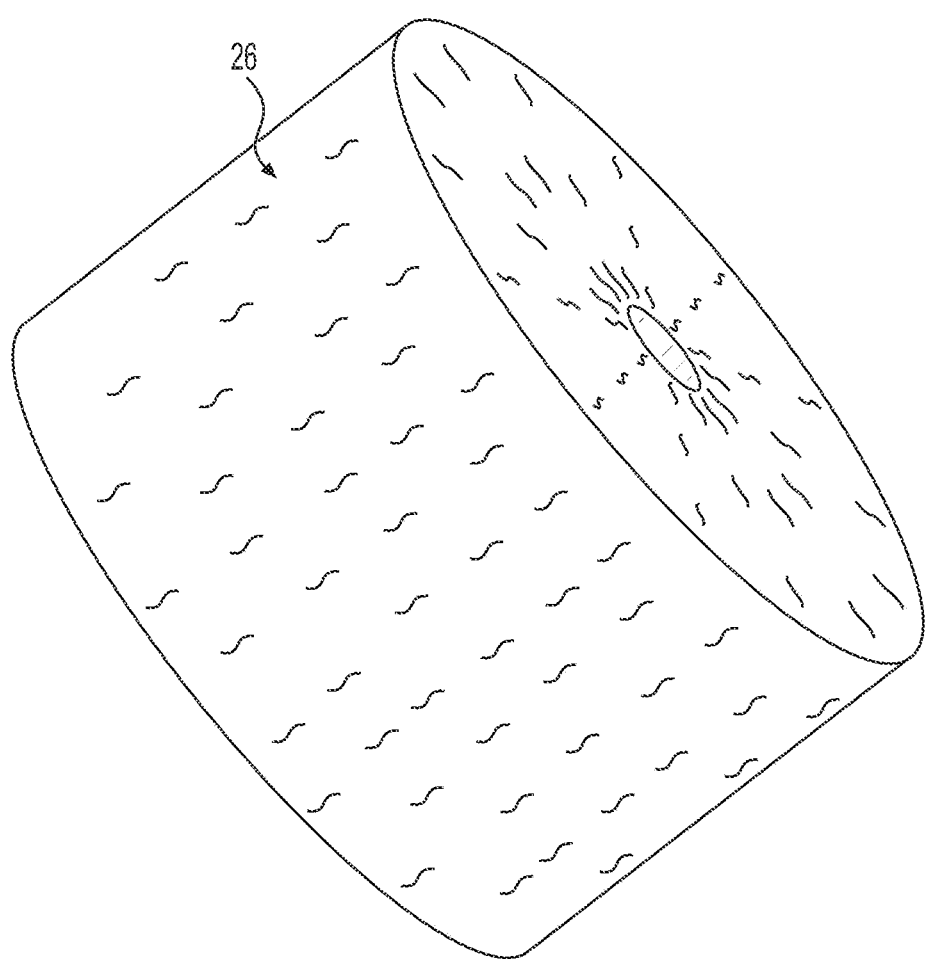
FIG. 4 shows at least a first embodiment of the second filter media in the filter device according to the present invention.

The front face plate 14 comprises an inlet port 18 which includes at least one aperture that allows the flow of oil or fuel into the body 12 of the filter 10. The inlet port 18 opens to the outer peripheral region inside the body 12. As shown in FIG. 3, a first filter media 28 made from perforated sintered stainless steel or other similar material is formed as a pleated cylinder with a hollow tubular center. The first filter media is positioned adjacent to a second filter media 26. As shown in FIG. 4, the second filter media 26 which is made from long-fiber material is formed as a cylinder also with a hollow tubular center and positioned adjacent to and concentric with the hollow tubular center of the first filter media 28. In one embodiment, the second filter media 26 may be formed as a cylindrical element with a hollow tubular center, wherein the oil or fuel flowing from the first filter media 28 contacts and flows through the body of the second filter media 26. The oil or fuel then flows out the body of the second filter media 26 into a central outlet cylinder 32 to then flow out of the filter 10. The long-fiber material for the second filter media 26 is selected and formed from material designed to filter and capture water particles (i.e., native water) out of the oil, fuel or other fluid passing through the second filter media 26.

In at least one embodiment, element 34 is a spacer plate that is incorporated to maintain the separation between the first filter media 28 and the second filter 26. In addition, spacer plate 36 may be used to maintain the structural integrity of the second filter media 26 due to it being constructed from long fiber material, which depending on the selection for the long fiber material may or may not be able to remain rigid on its own. However, further depending on the selection of the structure and materials of both the first and second filter media, elements 34,36 may just be hollow spaces between the first filter media 28, the second filter media 26 and a hollow space 30.

Figure 5:
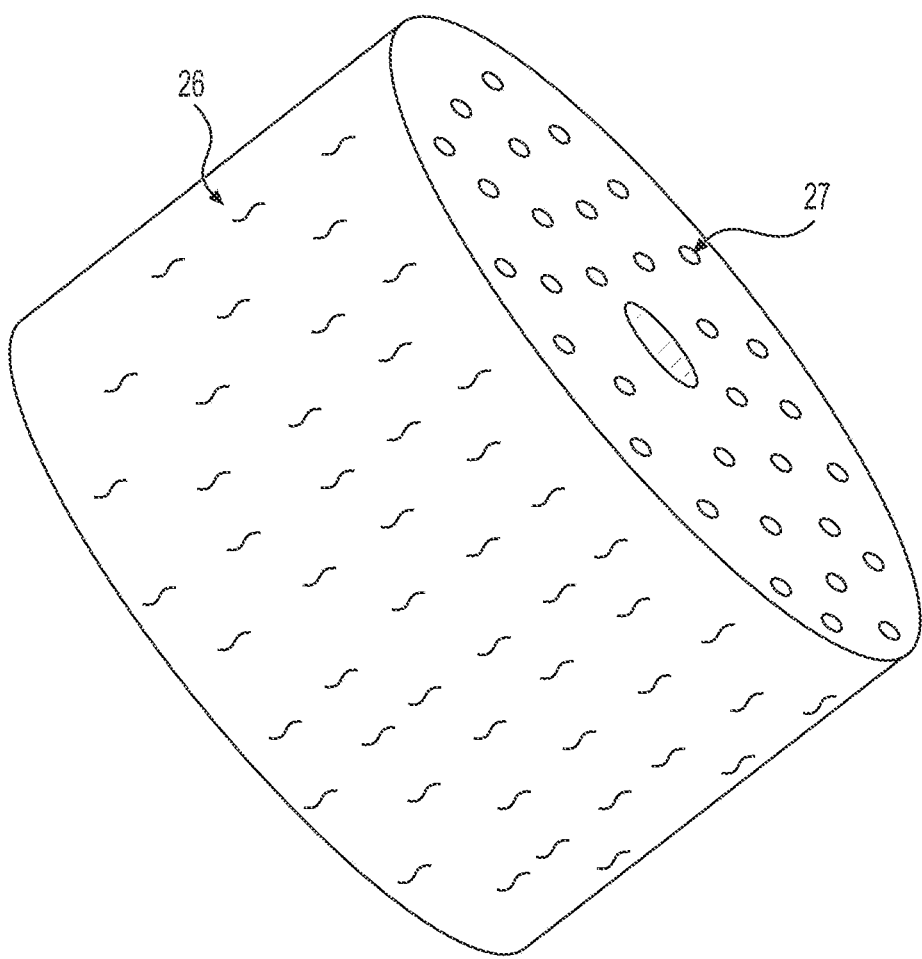
FIG. 5 shows at least a second embodiment of the second filter media in the filter device according to the present invention.

Alternatively, as shown in FIG. 5, the second filter media 26 may be formed as a cylindrical element with both a hollow tubular center and a plurality of smaller hollow tubes 27 imbedded in the long-fiber material and extending longitudinally in the second filter media 26. The oil or fuel flowing from the first filter media 28 contacts and flows through the second filter media 26. The oil or fuel flows through the body and through the smaller hollow tubes of the second filter media 26 to then flow out to the far side of the second filter media 26 within the body 12 of the filter 10. Alternatively, the same process may be directed using a folded and rolled design of the filter media in which the hollow tubes are replaced by channels and ridges to achieve increased density and/or surface area in the filter material.

At the far side of the second filter media 26, there is the hollow space 30 into which a far end of an outlet cylinder 32 is open such that the oil or fuel flows out of the second filter media 26 and into the outlet cylinder 32. The outlet cylinder 32 is positioned within the cylindrical centers of the first and second filter media and connected to the outlet port of the front face plate 14. The outlet cylinder 32 is formed with perforations to allow a portion of the oil or fuel passing through the first and second filter media to mix back with the oil or fuel that is flowing back to the outlet port. The size and dimensions of a first set of the perforations along a top portion of the outlet cylinder 32 are selected and formed so as to account for 80% of the fluid flow through the filter 10. A second set of perforations along a bottom portion of the outlet cylinder 32 that are closer to the outlet port on the front face plate 14. The size and dimensions of the second set of perforations are selected and formed so as to account for the remaining 20% of the fluid flow through the filter 10.

The filter 10 may be constructed of any suitable material including metal or plastic by cutting or injection molding, for example. It is also possible to use emerging "3D-Printed" processes in a variety of materials including metals or plastics. It is also possible for the filter to be constructed of a composition of different materials, for example with the exterior constructed of plastic and the interior of metal. In use, the filter 10 may be threaded onto, or otherwise provided to, an engine or other part of a machine on which it is to be used either directly or indirectly, through the use of the adapter plate. As would be understood by those of skill in the art, it is preferred that the size, shape and configuration of the filter 10 and threaded portion of the outlet of the filter 10 is complementary to the engine and thread on which it is used.

The operation of the filtering process implemented by the filter device of the present invention, with reference to FIGS. 1 and 2, is described as follows:
 a. Oil enters the filter 10 through the inlet ports 18 formed on the front face plate 14 of the filter 10 as would normally occur in a conventional filter for the particular engine where it is installed;

b. The oil flows upwards along the inside surface and fills up the interior volume of the external cover/container of the filter device through the stainless steel first filter media 28;

c. Oil pressure forces the oil to fill the container of the filter 10 and is passed through the stainless steel first filter media 28 in an upward and inward radial direction through the pleats (see FIG. 3) created in the stainless steel first filter media 28 prior to assembly. The stainless steel first filter media 28 has a lower resistance value to flow. At this stage, the largest particles and also smallest particles (based on the particular rating for which the stainless steel first filter media 28 is designed). For illustrative purposes only, the engine to which this embodiment of the present invention is applied requires a minimum flow rate of 80% of the flow in order to maintain adequate lubrication;

d. The same oil pressure also forces the oil to flow into the second long-fiber second filter media 26 located adjacent to the stainless steel first filter media 28 and further inside the external cover/container. As illustrated in FIGS. 4 and 5, the second filter media 26 is formed in variable rolled and pleated layers based on smaller flow tubes or channels fabricated from the same material that permit 20% of the oil to flow through;

e. The oil flows through both filter media into a volume or hollow space 30 at the far end of the cover/container body 12 which is open to the outlet cylinder 32, which is a central return tube or passageway, to then flow out through the outlet port 13 at the front face plate 14. Perforations in the central outlet cylinder 32 equaling 80% in the top half and with smaller perforations located at the bottom of the tube closest to the outlet port 13 to the engine. These smaller perforations at the bottom provide 20% of the flow rate; the determination of how this minimum proportion is determined and controlled is based on the formula for designing the outlet port 13; and f. The two flow rates are joined in the central outlet cylinder 32 through the use of a "Venturi" design such that the increased pressure at a higher flow rate draws the 20% flow back in and mixes as the oil returns to the engine's oil sump. While the total time to filter the entire volume/capacity of the oil sump will vary by engine type and volume of oil, typically and for the illustration/example submitted here the time will be about 10 minutes of continuous operation.

Tests on the use of the combination of the first and second media as described above have shown that the oil maintenance interval can be extended 6-8 times as done with current filter designs.

The present invention can provide advantages over existing filtration methods and devices including: significant reduction in the cost of repairs and maintenance on engines and hydraulic pumps; reduction in the cost of oil, filters and labor to service engines; assured optimum engine performance, availability and extended lubricated component service life; significant reduction in cost and volume of waste oil disposal, and carbon foot print with a direct correlation between improved fuel economy and improved standard of emissions; and maintenance of performance and significantly extended service of fuel pumps and injectors.

Other embodiment of the filter 10 are contemplated in accordance with the preferred embodiments of the present invention. For example, while it is preferred that the filter 10 is used to filter oil or diesel or other fuel for a motor, filtration of other fluids and use on other engines or equipment for filtration purposes are able to be performed with the filter 10 of the present invention. Further, the location of the first and second filter media is not fixed with respect to their relative positions to each other and within the filter 10 and may be adjusted along with the amount of material to optimize the benefit to the end-user application. Even more, the design of the front face plate 14 may be varied to adapt the connecting of the filter 10 to whatever device is intended to benefit from the filtration. The oil and/or fuel reservoirs on which the filter 10 may be used include, but are not limited to, engines, oil sumps, dry sump systems, hydraulics and gear boxes. Modifications and variations as would be apparent to a skilled addressee are deemed to be within the scope of the present invention.

What is claimed is:

1. A filter device comprising:
   a cylindrical body having a first open side and a second closed side;
   a front face plate fixedly mounted on the first open side, the front face plate having an inlet port and a central outlet port;
   a first filter media formed as a first cylinder with a first inner tubular passage, the first filter media being formed from sintered stainless steel; and
   a second filter media formed as a second cylinder with a second inner tubular passage, the second filter media being further formed to be operatively positioned adjacent to the first filter media with the second inner tubular passage concentric with the first inner tubular passage of the first filter media, the second filter media being formed from a water capturing material; and
   a central outlet tubular passage positioned in and concentric with the first and second inner tubular passages, wherein
   the first and second filter media are operatively positioned in the cylindrical body such that a fluid inputted into the inlet port will flow through the first filter media to capture contaminant particles therein and then through the second filter media to capture water therein and then through the central outlet tubular passage to the outlet port wherein the central outlet tubular passage includes an outlet cylinder positioned therein to receive the fluid flowing from the second filter media, the outlet cylinder being formed with perforations such that a portion of the fluid passing through each of the first and second filter media mixes with the fluid flowing back to the outlet port from the second filter media.

2. A filter device according to claim 1, wherein the first filter media is formed as a perforated pleated cylinder.

3. A filter device according to claim 1, wherein the second filter media is formed from long-fiber material with the second inner tubular passage defined therein, and
   the inputted fluid flows through the second filter media into the second inner tubular passage to the outlet port.

4. A filter device according to claim 1, wherein the second filter media is formed from long-fiber material with a plurality of hollow tubes imbedded in the long-fiber material and extending longitudinally in the second filter media, and
   the inputted fluid flows through the second filter media into the plurality of hollow tubes to the outlet port.

5. A filter device according to claim 1, wherein the second filter media is formed from a long-fiber non-cellulosic material in a pleated and concentrically rolled element media, and the inputted fluid flows through the second filter media into the plurality of channels created within the formed media and out to the outlet ports.

\* \* \* \* \*